United States Patent
Schick et al.

(10) Patent No.: US 12,511,856 B2
(45) Date of Patent: Dec. 30, 2025

(54) METHOD FOR PROVIDING USER-RELATED AND/OR PROCESS-RELATED INFORMATION BY A DISPLAY DEVICE

(71) Applicant: TRINAMIX GMBH, Ludwigshafen Am Rhein (DE)

(72) Inventors: Friedrich Schick, Munich (DE); Ksenia Antonova, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/832,997

(22) PCT Filed: Feb. 15, 2023

(86) PCT No.: PCT/EP2023/053797
§ 371 (c)(1),
(2) Date: Jul. 25, 2024

(87) PCT Pub. No.: WO2023/156480
PCT Pub. Date: Aug. 24, 2023

(65) Prior Publication Data
US 2025/0131678 A1    Apr. 24, 2025

(30) Foreign Application Priority Data
Feb. 15, 2022 (EP) ..................... 22156863
Apr. 12, 2022 (EP) ..................... 22167914

(51) Int. Cl.
*G06V 10/141* (2022.01)
*G06F 21/32* (2013.01)
*G09G 3/20* (2006.01)

(52) U.S. Cl.
CPC ............ *G06V 10/141* (2022.01); *G06F 21/32* (2013.01); *G09G 3/2096* (2013.01); *G09G 2354/00* (2013.01)

(58) Field of Classification Search
CPC .... G06V 10/141; G06F 21/32; G09G 3/2096; G09G 2354/00
See application file for complete search history.

(56) References Cited

U.S. PATENT DOCUMENTS

| | | |
|---|---|---|
| 2012/0258773 A1 | 10/2012 | Alvarez Rivera et al. |
| 2017/0150025 A1* | 5/2017 | Tang .................... G06V 40/193 |
| 2019/0037173 A1 | 1/2019 | Lee et al. |

OTHER PUBLICATIONS

International Search Report for PCT/EP2023/053797 dated May 16, 2023, 3 pages.
Written Opinion for PCT/EP2023/053797 dated May 16, 2023, 13 pages.

* cited by examiner

*Primary Examiner* — Stephen G Sherman
(74) *Attorney, Agent, or Firm* — Armstrong Teasdale LLP

(57) ABSTRACT

Disclosed herein is a method for controlling a display device including: a) receiving (S1) a process request for executing a process including at least one step executable by the display device; b) determining (S2) user-related and/or process-related information based on the received process request; c) generating (S3) a display control signal based on the user-related and/or process-related information, where the display control signal is suitable for controlling the functioning of at least one pixel of a display unit of the display device; and d) providing (S4) the generated display control signal.

14 Claims, 7 Drawing Sheets

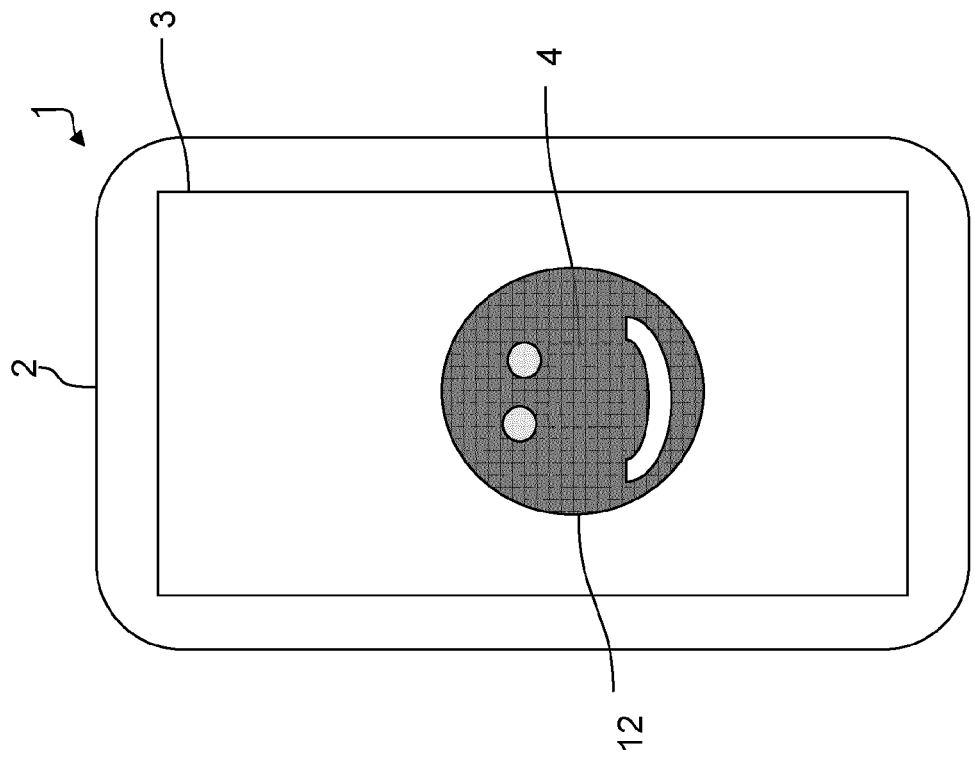
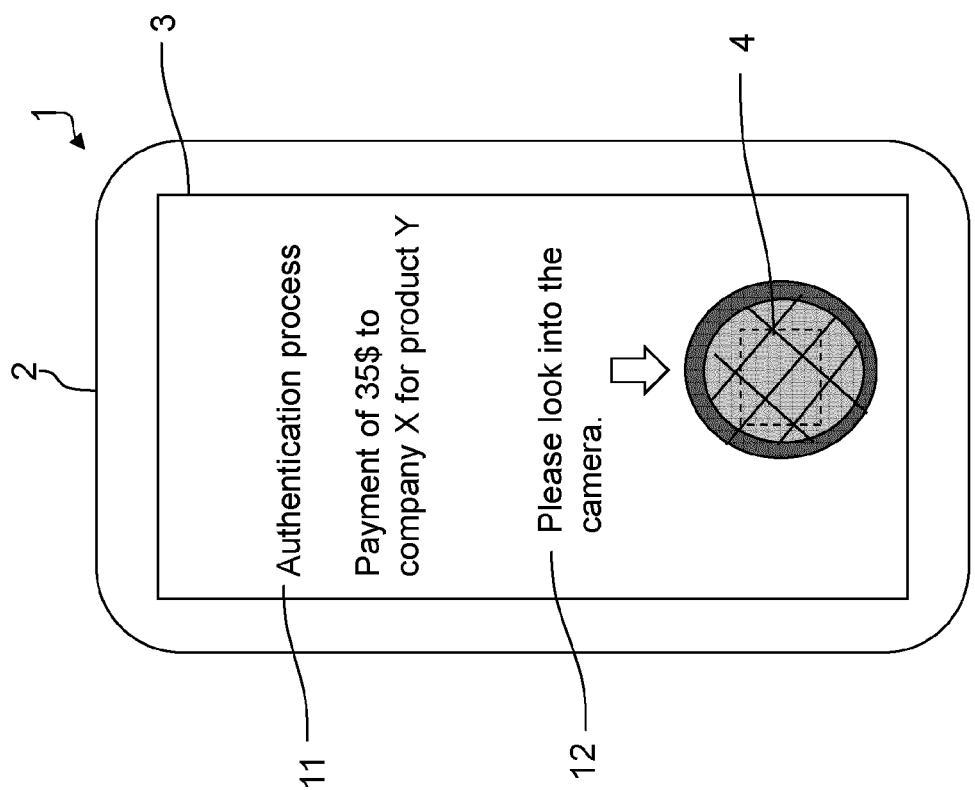

METHOD FOR PROVIDING USER-RELATED AND/OR PROCESS-RELATED INFORMATION BY A DISPLAY DEVICE

CROSS-REFERENCE TO RELATED APPLICATIONS

This application is a U.S. National Phase Application of International Patent Application No. PCT/EP23/53797, filed Feb. 15, 2023, and claims priority to European Patent Application No. 22156863.7, filed Feb. 15, 2022, and European Patent Application No. 22167914.5, filed Apr. 12, 2022, the entire contents of which are hereby incorporated by reference herein.

The present disclosure relates to a method for providing user-related and/or process-related information by a display device to a user. The present disclosure further relates to a display device, which is in particular adapted to provide user-related and/or process-related information.

Display devices, like mobile devices, such as smartphones, tablets and the like, usually have a front display such as an organic light-emitting diode (OLED) area. However, such mobile devices need some sensors on their front side such as for identifying fingerprints, for one or more self-portrait cameras, for 3D sensors and the like. In order to reduce possible interference of measurements using said sensors because of presence of the front display, it is known to have a special area where the sensor is placed and no display is present or disturbed. Such a special area is the so-called notch.

Document WO 2021/105265 A1 describes a detection system which can be placed behind the OLED display, i.e. a projector illuminates a scene through the display and a camera records the reflected light again through the display. In WO 2021/105265 A1, the user cannot see where the camera actually is, so he may not properly look at the camera which may cause problems in processes like face detection. Moreover, the user has no direct feedback when something is happening, e.g. a secure authentication and/or detection of user-related properties is taking place.

It is therefore an object of the present disclosure to improve the operation of a display device.

According to a first aspect, a method for controlling a display device is provided. The method comprises the steps of:
a) receiving a process request for executing a process comprising at least one step executable by the display device,
b) determining user-related and/or process-related information based on the received process request,
c) generating a display control signal based on the user-related and/or process-related information, wherein the display control signal is suitable for controlling the functioning of at least one pixel of a display unit of the display device, and
d) providing the generated display control signal.

According to a second aspect, a display device is provided. The display device comprises:
a display unit,
a processor unit adapted to:
receive a process request for executing a process including illumination and/or measuring and/or recording,
determine user-related and/or process-related information based on the received process request, and
generate a display control signal based on the user-related and/or process-related information, wherein the display control signal is suitable for controlling the functioning of at least one pixel of the display unit, and
an output unit for outputting the generated display control signal.

Moreover, besides the display unit, the processor unit and the output unit, the display device particularly includes an illumination source, e.g. an active light source, a sensor, e.g. an optical sensor, and imaging unit, e.g. a camera. These units are particularly located within a housing of the display device, and behind the display unit when viewed from an exterior of the display device.

The features and embodiments described in the following apply to both the method of the first aspect and the display device according to the second aspect.

Advantageously, the operation of the display device is improved by providing the user-related and/or process-related information to the user, in particular during the execution of the process. Thus, a user guidance during the execution of the process including illumination and/or measuring and/or recording is improved.

In an embodiment, the user-related and/or process-related information giving user guidance and/or providing feedback to the user is presented using the generated display control signal such that the display unit is not disturbed noticeable by the user as a reaction to illumination and/or measuring and/or recording.

In a further embodiment, the user-related and/or process-related information is presented using the generated display control signal such that at least a display area of the display unit covering an illumination source, e.g. an active light source, during illumination and/or a display area covering a sensor, e.g. an optical sensor, during measuring and/or a display area covering an imaging unit, e.g. a camera, during recording is included into the presentation of the process-related and/or user-related information.

In this way, the user can be guided, for example to look at a correct position, where the camera is located. As an additional effect, any display artifacts caused by a projector, are less obvious or fully absent if the presentation of information contains at least darkened parts (e.g. presenting information in dark mode, preferably completely black parts) where the display area covering the active light source during illumination and/or the display area covering the sensor above the display during measuring and/or the display area covering a camera during recording is present.

In embodiments, the generated and/or provided display control signal is used to include at least a part of the display area of the display unit covering an illumination source during illumination and/or at least a part of the display area covering a sensor during measuring and/or at least a part of the display area covering an imaging unit during recording is included into the presentation of the process-related and/or user-related information. One may contemplate of an operated display where the display area covers a light source directed towards the user, a camera facing towards the user for capturing an image of the user and/or the presented user- or process-related information. Preferably, the display is provided at the front side of the device.

In embodiments, the display control signal is configured to control the plurality of pixels of the display unit covering the camera and/or illumination source and/or sensor such that they are not fully turned on during the presentation of user-related and/or process-related information. Fully turned on may refer to a maximum brightness of the pixel, and "not fully turned" on refers to a dimmed mode of the pixel, for example.

At least darkened parts of the display unit refer to an area comprising a plurality of pixels (at least two pixels), wherein the plurality of pixels is not fully turned on. A pixel is the smallest part of a display. Each pixel may be controlled separately. Pixels may comprise a monochrome scheme or a color scheme, e.g. RBG scheme. In the monochrome case, the pixel brightness may be lower than 100% of the full pixel brightness. For displaying colors in the RGB scheme, the pixel may comprise a red, a green and a blue part. By controlling the value for each part, a specific color can be selected. In this case, each part may be controlled such that the brightness is regulated to be lower than 100% of the red, green or blue value for full brightness. In particular, the full brightness of a pixel may be 50% or less. In some embodiments, the red, green or blue value may be 50% or less of the red, green or blue value for full brightness.

In some embodiments, the red, green and blue value may be in average 50% or less of the full brightness. At least darkened area of the display may be an area where the pixels are turned off fully, a monochromatic area or a multicolor area. A monochromatic area may be an area where the pixels comprised in the area all share the same values for the brightness of the pixel, e.g. the same red, blue and green values or the same degree of full brightness of the pixels. A multicolor area may be an area where not all pixels comprised in the area share the same values for the brightness of the pixel, e.g. at least two pixels differing in the red, blue and/or green values or at least two pixels differing in the degree of full brightness of the pixels. Multicolor area may be an area where more than one color is displayed. Multicolor area may represent a pattern and/or a color gradient. A color gradient can be considered as a color change. The color change may be from a specific color to a brighter or darker color. During the change the pixel brightness may be changed to higher values of the full brightness of the pixel for changing to brighter colors or lower values of the full brightness of the pixel for changing to darker colors.

It is understood that controlling the functioning of at least one may refer to controlling at least one pixel value associated with at least one pixel. Hence, controlling can be understood as generating suitable electronic signals or values indicative of a respective state of a pixel. Controlling may include processing such pixel values associated to one or more pixels.

In embodiments, a pixel value associated to a pixel is indicative of a color and/or brightness of the pixel. The display control signal may define the value. Hence, the display control signal determines a color and brightness of a pixel through the pixel value, for example. A "value" can be seen as a code for the operation of the respective pixel. The pixel value can be processed as a binary code. A plurality of pixel values can be stored and processed as a matrix or array of pixel values.

In embodiments. controlling includes generating or amending a plurality of pixel values such that activated pixels of the display device cover the illumination source, the camera and/or the sensor. A plurality of activated pixels may for an area providing user readable information, e.g. in terms of symbols.

The term "pattern" as used herein refers, without limitation, to an arbitrary known or predetermined arrangement comprising at least one arbitrarily shaped symbols. The pattern may comprise at least one symbol. The pattern may comprise an arrangement of periodic or non-periodic symbols. The pattern can be at least one of the following: at least one quasi random pattern; at least one Sobol pattern; at least one quasiperiodic pattern; at least one point pattern, in particular a pseudo-random point pattern; at least one line pattern; at least one stripe pattern; at least one checkerboard pattern; at least one triangular pattern; at least one rectangular pattern; at least one hexagonal pattern or a pattern comprising further convex tilings. A symbol is at least a part of a pattern. The symbols can be any one of: at least one point; at least one line; at least two lines such as parallel or crossing lines; at least one point and/or one line; at least one letter; at least one periodic arrangement of symbols; at least one arbitrary shaped pattern.

A pattern is especially suitable for gathering the attention of the user of the display device since patterns are more noticeable than plain monochromatic display areas. This contributes to the improvement of processes involving illuminating, measuring and/or recording, e.g. during authentication processes and the improvement of user experience due to the intuitive guidance. In particular, patterns changing over time are recognizable and provide an intuitive guiding of the user e.g. by indicating a motion that should be followed by the user.

The at least one symbol in a pattern may be arranged such as to represent a visual representation of a living organism and/or an arbitrary thing and/or writing. The arbitrary thing may be suitable for being represented visually. The writing may be suitable to be read by the user.

A user is a living organism with control over the display device, preferably a human. The user may operate the display device via buttons, screen, in particular touch screen, gestures, voice or the like. The user may operate the display device such that a process is triggered or initiated. The user may operate a functioning or an application of the display device. The functioning or the application may trigger or initiate the process.

A process comprises at least one step executable by the display device. In particular, the at least one step may comprise illuminating and/or measuring and/or recording executable by the display device, i.e. at least one illumination step and/or at least one measuring step and/or at least one recording step. For example, the process is an authentication process or part of an authentication process or involves recording an image, measuring with a sensor or illuminating with an illumination source. For example, the certain process is an authentication process or part of an authentication process. The certain process includes illumination and/or measuring and/or recording executable by the display device, i.e. at least one illumination step and/or at least one measuring step and/or at least one recording step. The process request is a request requesting the execution of the process. The process request may be sent by an application initiating the execution of the process, e.g. initiating authentication of the user. The process request may include information about the context of the process including the requested illumination and/or the requested measuring and/or the requested recording and may be therefore linked to process-related and/or user-related information. Thus, the process-related and/or user-related information can be determined from the process request. Based on the determined user-related and/or process-related information, the display control signal is generated and finally provided.

The display control signal may be suitable for controlling the functioning of at least one pixel, in particular for controlling the functioning of at least an area of the display unit covering the camera and/or illumination source and/or sensor. The display control signal may be suitable for controlling the functioning of at least an area of the display such that at least darkened parts are displayed, in particular for controlling the functioning of at least an area of the display unit covering the camera and/or illumination source and/or sensor such that at least darkened parts are displayed.

Illumination particularly includes at least one illuminating step executable by the display device, in particular by the illumination source of the display device. In particular, the illumination source may be an active light source. Measuring particularly includes at least one measuring step executable by the display device, in particular by a sensor, e.g. the optical sensor, measuring at least one reflection of the illuminated light output by the illumination source. Recording particularly includes at least one recording step executable by the display device, in particular by the imaging unit.

The display device can be a smartphone, a tablet, a laptop, a personal computer (PC), an automated teller machine (ATM), a media player or any similar device. As mentioned above, the display device includes a display (display unit) which may be a screen or a touch screen, in particular a translucent touchscreen, e.g. an OLED display. The display device can be used to display visual information, in particular including sensitive information. Such information can include text, images, videos or the like. In the following, the term "person" can be used as a synonym to the term "user". In particular, the display device is a display device having no notch.

The imaging unit can be orientated such that it is capable of sensing the presence of a person's while the person is interfacing, either passively or actively, with the display unit of the display device. In particular, the imaging unit is a front camera of the display device. The imaging unit can be orientated on a same side of the display device as the display unit. The imaging unit can face the faces of persons interfacing, either passively or actively, with the display unit. As mentioned, the imaging unit can be provided within the housing of the display device (embedded within the display device, in particular within the display unit) or as an add-on unit, such as a webcam. The imaging unit can be adapted to capture one image, a sequence of images and/or a video of the surroundings.

The imaging unit can be an infrared (IR) camera. Using an IR camera can be advantageous because a red blue green (RBG) camera of the display device is often already used or blocked by an application having exclusive access to the RBG camera. In smartphones for example, IR cameras are often used for less purposes, and are typically only used by the operating system of the smartphone for authentication.

The imaging unit may record a flood light image (which can be an image illuminated by a flood light source), so the image is taken from the scene (surrounding the display device) which is either lighted by ambient light or a flood light source. The imaging unit may also record an image while the scene is illuminated with patterned light, for example a point cloud. Such an image can contain information like distance or materials, for example skin. Using flood light, patterned light or a combination of both allows analyzing the scene in great detail and false analyses can be avoided.

The display device may include a processor (such as a processor unit), such as a central processing unit (CPU). The processor can perform image processing on the image to detect relevant faces thereon. Face detection can include the process of detecting and/or locating a face within the image. In order to detect faces on the image, the image can be analyzed for the presence of a face using a variety of face detection techniques available on the market. For example, a trained neural network can be used. Such a neural network can be trained using labelled images including images with and without faces and corresponding labels.

According to an embodiment, the generated display control signal is provided to the display unit, wherein the display control signal is configured such that at least a display area of the display unit covering an illumination source, e.g. an active light source, during illumination and/or a display area covering a sensor, e.g. an optical sensor, during measuring and/or a display area covering the imaging unit, e.g. a camera, during recording is included into the presentation of the process-related and/or user-related information. By means of the generated display control signal, the user-related and/or process-related information is presented such that the display unit is not disturbed noticeable by the user as a reaction to illumination and/or measuring and/or recording.

A user-related information comprises information selected for the user involved in the process.

According to an embodiment, the user-related information includes:
  a user guidance for navigating the user through the process,
  a required user action, in particular a request for inputting a personal identification number,
  a specific information for the user based on a current status of the user, in particular requesting inputting authentication information by the user,
  a user representation, and/or
  information specifically provided for the user, in particular selected by an application triggering the process request.

User guidance for navigating the user through the process may comprise instructions and/or explanations for the user about what to do and how. Examples may be advising the user to look into the camera, to smile, to turn the head in a corresponding position or the like. A required user action can be an action that the user has to perform in order for the process to continue. Examples may be selecting an option out of several, entering additional information such as authentication information, or the like. Information specifically provided for the user, in particular selected by an application triggering the process request are information that the user may need or may find interesting during the process. In some embodiments, information specifically provided for the user may be provided by the application triggering the process. Examples for such information may be payment details such as payment amount or customer number in a process of authentication for payment, name or symbol referring to the application providing the information or the like. A user representation is any representation suitable for representing the user's physical appearance. Examples may be a representation of the user's face in a face authentication process.

For example, an increased transparency for the user during the execution of the process, e.g. a face authentication process, is achieved by representing the user (e.g. during illumination) wherein the representation can be an image of the user recorded with a RGB camera, an Animoji (animated emoji) generated from image data obtained with the active light source illuminating light and the optical sensor measuring at least one reflection of the illuminated light. Furthermore, advantages of a user representation are besides increasing the transparency for the user, other error sources can be recognized, like grease or dirt on the display.

A process-related information comprises information selected for the execution of the process.

According to an embodiment, the process-related information includes:
  information associated with a type of the process, upcoming events related to the process, and/or highlighting parts of the display device involved into the process.

Information associated with the type of process refers to a name or a symbolic representation of the process. Exemplary names for processes can be authentication process, payment process, or the like. Upcoming events related to the process may be subsequent processes or termination of the process or an application after the process is completed. Parts of the display device may be highlighted with symbols, representation or text referring to a part of the display device. In an exemplary scenario, the camera may be highlighted by means of text, a camera symbol close to or above the camera. In other scenarios, a fingerprint sensor may be highlighted by representing a fingerprint in the area where the finger of the user needs to be placed.

According to a further embodiment, the method further comprises a step e):

executing the process in response to the received process request, including controlling the display unit by means of the provided display control signal such that the user-related and/or process-related information is output to the user by said display unit.

According to a further embodiment, outputting the user-related and/or process-related information includes providing a user guidance to the user during the execution of the process or after the execution of the process.

According to a further embodiment, the display unit comprises a translucent touch screen.

According to a further embodiment, outputting the user-related and/or process-related information includes representing an image of the user recorded with an imaging unit of the display device, an animated emoji generated from image data obtained by an active light source illuminating light and an optical sensor measuring at least one reflection of the illuminated light and/or a simplified drawing generated from image data obtained by the active light source illuminating light and the optical sensor measuring at least one reflection of the illuminated light.

According to a further embodiment, the method further comprises the step of:

receiving an information request for providing additional information to the user, and determining, in step b), the user-related and/or process-related information based on the received process request and the received information request.

According to a further embodiment, the information request is specific for the process request. Therefore, the information request may be associated to or dependent on the process request. By means of the information request, additional information may be provided to the user, for example from the application triggering the process. This may be advantageous since for different processes suitable information may be selected and associated. For example, in a scenario of authentication for payment, additional payment-related information (such as price, merchant, article to be bought or related articles) may be provided in contrast to additional information presented in an authentication process for unlocking a device or information presented in an illumination process initiated by an application for the detection of user-related properties (e.g. for skin care application, where the skin health can be deduced from the reflection properties of the skin).

According to a further embodiment, the information request and the process request are particularly triggered by one single application.

According to a further embodiment, the method further comprises the step of:

receiving feedback data indicating a result, in particular a success, of the execution of the process, wherein, if the received feedback data indicates a positive result, a positive feedback information is output to the user, and wherein, if the received feedback data indicates a negative result, step b) of determining the user-related and/or process-related information is restarted. A restarted determining may be additionally based on the feedback data indicating failure and/or possible improvements.

In particular, feedback data is associated with the success of the process including illuminating and/or measuring and/or recording in order to display to the user a positive feedback if the process was successful and restart the determination of process-related and/or user-related information if the process was not successful. The restarting may determine new user-related and/or process-related information additionally based on the feedback data indicating failure and/or possible improvements. For example, this information may include distance adjustments, instructions for actions to be completed by the user and/or solely the negative feedback about the unsuccessful process. The feedback data can be based on any data allowing to estimate a successful illuminating and/or measuring and/or recording. Exemplary parameters can be a distance between the user and the illumination source, the sensor, and/or the camera, orientation of user or parts of users body, material, probability for authentication of a user and/or detecting a living species and so on. In particular, such a probability for authentication of a user has to overcome a threshold to result in a positive feedback (success). Depending on the requirements for a successful process and the actual parameters, adequate feedback data can be generated, indicating e.g. a distance to large for good illumination.

According to a further embodiment, if the restarted determining step failed a specific number of times, an alternative action for determining new information is triggered. Thus, the alternative action to determining new information can be triggered after a specified number of trials like suggesting another process such as fingerprint authentication after failed face authentication.

According to a further embodiment, if the user-related and/or process-related information cannot be sufficiently presented to the user (user may have a disability, display may be partially hidden from view), additional actions may be triggered to provide information such as audible information, vibrational information or a support may be activated.

According to a further embodiment, the steps a) to e) are executed by an operating system of the display device.

According to a further embodiment, outputting (S5) the user-related and/or process-related information may include providing a user guidance to the user during the execution of the certain process or after the execution of the certain process.

In particular, the display device is constructed such as to be capable to perform steps a) to e) without any additional programming or the like. For example, programs for performing steps a) to e) can be part of the firmware of the display device.

According to a further embodiment, the step d) of outputting the display control signal includes outputting the display control signal to an application controlling the display unit when executed on the display device. The application (app) can be a program which, when executed on the display device, performs specific tasks including controlling the display unit. The application may be linked to the display device.

According to a further embodiment, the user-related information includes:
- a user guidance for navigating the user through an illumination process,
- a required user action, in particular a request for inputting a personal identification number,
- a specific information for the user based on a current status of the user, in particular requesting inputting authentication information by the user,
- a user representation,
- information specifically provided for the user, in particular selected by an application triggering the process request, and/or
- the process-related information includes:
- information associated with a type of the certain process,
- upcoming events related to the certain process, and/or
- highlighting parts of the display device (1) involved into the certain process.

According to a further embodiment, the display device may be adapted to perform the method steps according to any one the embodiments as described herein.

According to a further embodiment, the method further comprises the step of:
- initiating (in particular triggering) the execution of steps a) to d) and in particular e), wherein the initiating particularly includes providing the process request for executing a process including illumination and/or measuring and/or recording.

According to a further embodiment, the display device of the second aspect is adapted to perform the method steps according to the first aspect or according to an embodiment thereof.

According to a further embodiment, the display unit, the imaging unit, the processor unit and the output unit are part of the hardware of the display device, wherein the display device is configured to execute an application which is configured to execute the method steps according to the first aspect or according to an embodiment thereof.

According to a third aspect, a non-transitory computer-readable data medium storing a computer program including instructions for executing steps of the method according to the first aspect or an embodiment of the first aspect is provided.

In embodiments, a computer-program or computer-program product comprises a program code for executing the above-described methods and functions by a computerized control device when run on at least one control computer, in particular when run on the display device. A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

According to a fourth aspect, use of the display control signal obtained by the method according to the first aspect or an embodiment of the first aspect for providing user-related and/or process-related information based on a process request for executing a process including illumination and/or measuring and/or recording is provided.

In a further aspect, the display device, in particular the display device according to the second aspect or an embodiment of the aspect, is a smartphone or a tablet having a translucent screen as the display unit. In this aspect, the imaging unit is for example a front camera. The imaging unit can be located on an interior of the display device, behind the translucent screen. The imaging unit can include an illumination source for emitting light through the translucent screen to illuminate the surroundings. The imaging unit can further include an optical sensor for receiving light from the surroundings and passing through the translucent screen. The optical sensor may general a sensor signal in a manner dependent on an illumination of a sensor region or light sensitive area of the optical sensor. The sensor signal may be passed onto the processing unit to reconstruct an image of the surroundings and/or to process the image, in particular along the lines defined above.

Further possible implementations or alternative solutions of the invention also encompass combinations—that are not explicitly mentioned herein-of features described above or below in regard to the embodiments. The person skilled in the art may also add individual or isolated aspects and features to the most basic form of the invention.

Further embodiments, features and advantages of the present invention will become apparent from the subsequent description and dependent claims, taken in conjunction with the accompanying drawings, in which:

FIGS. 7 and 8 show an exemplary embodiments of a display device displaying relevant information in a process.

In the Figures, like reference numerals designate like or functionally equivalent elements, unless otherwise indicated.

Figure 1:
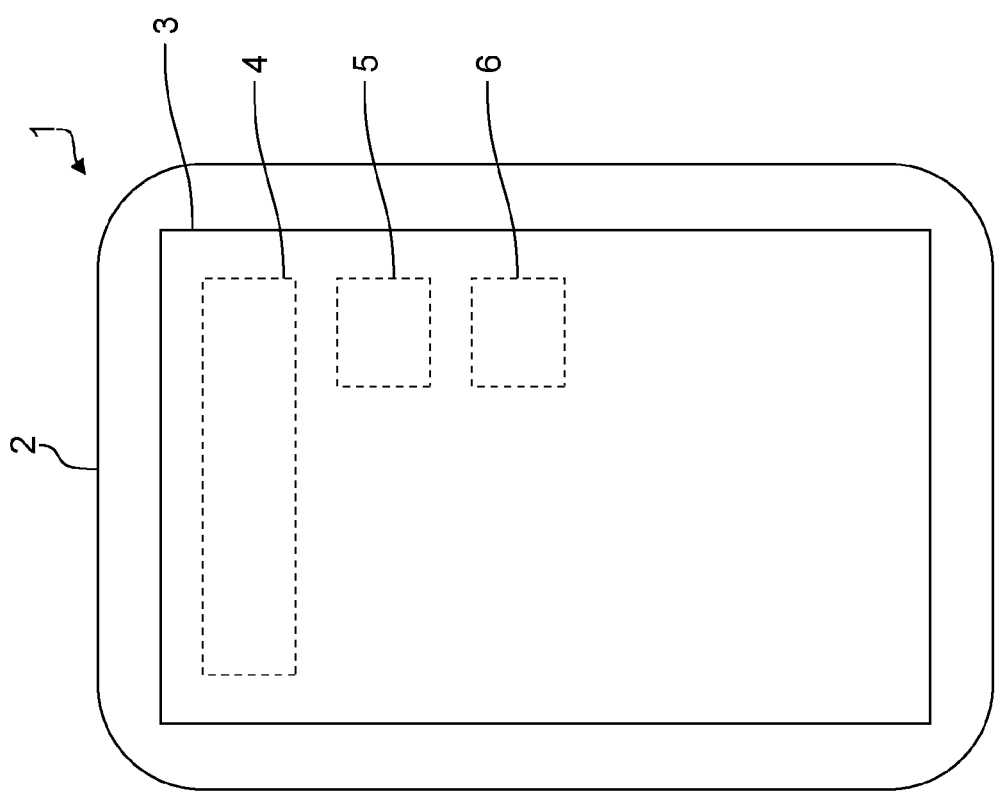
FIG. 1 shows a display device according to a first embodiment.

FIG. 1 shows a display device 1 according to a first embodiment. The display device 1 is a smartphone and includes a translucent touchscreen 3 as a display unit. The display unit 3 is configured for displaying information. Such information can include a text, image, diagram, video, or the like. Besides the display unit 3, the display device 1 includes an imaging unit 4, a processor unit 5 and an output unit 6. In FIG. 1, the imaging unit 4, the processor unit 5 and the output unit 6 are represented by dashed squares because they are located within a housing 2 of the display device 1, and behind the display unit 3 when viewed from an exterior of the display device 1.

Figure 2:
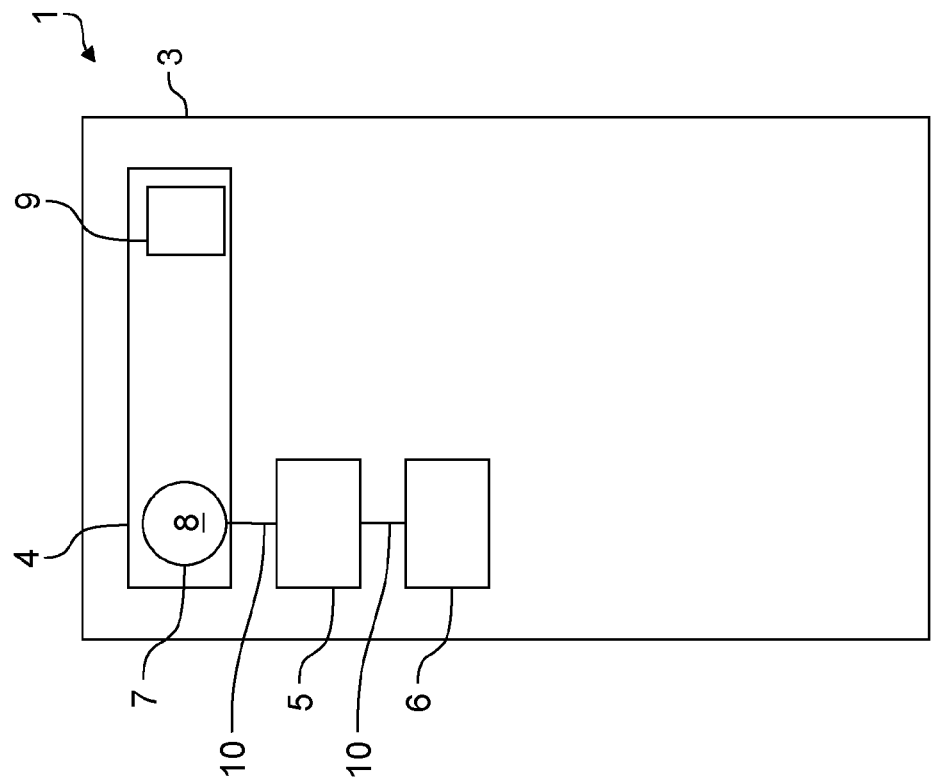
FIG. 2 shows components of the display device of FIG. 1.

FIG. 2 shows the components of the display device 1 located on the interior of the housing 2 in more detail. FIG. 2 corresponds to a view onto the display unit 3 from an interior of the display device 1, with the imaging unit 4, the processor unit 5 and the output unit 6 being located in front of the display unit 3.

The imaging unit 4 is a front camera. The imaging unit 4 is configured to capture an image of surroundings of the display device 1. In detail, an image of a scene in front of the display unit 3 of the display device 1 can be captured using the imaging unit 4. The surroundings are particularly defined as a half-sphere located in front of the imaging unit 4 and centered around a center of the display. The radius of the half-sphere is 5 m.

The imaging unit 4 includes an illumination source 9 and an optical sensor 7 having a light sensitive area 8. The illumination source 9 may be an infrared (IR) laser point projector realized by a vertical-cavity surface-emitting laser (VCSEL). The IR light emitted by the illumination source 9 shines through the translucent display unit 3 and generates multiple laser points on the scene surrounding the display device 1. When an object, such as a person, is located in front of the display device 1 (in the surroundings of the display device 1, facing the display unit 3 and the imaging unit 2), an image of the object is reflected towards the imaging unit 4. This reflected image also includes reflections of the laser points.

Instead of the illumination source 9 being an IR laser pointer, it may be realized as any illumination source capable of generating at least one illumination light beam for fully or partially illuminating the object in the surroundings. For example, other spectral ranges are feasible. The illumination source 9 may be configured for emitting modulated or non-modulated light. In case a plurality of illumination sources 9 is used, the different illumination sources 9 may have different modulation frequencies. The illumination source 9 may be adapted to generate and/or to project a cloud of points, for example the illumination source 9 may comprise one or more of at least one digital light processing (DLP) projector, at least one Liquid crystal on silicon (LCoS) projector, at least one spatial light modulator, at least one diffractive optical element, at least one array of light emitting diodes, at least one array of laser light sources.

The optical sensor 7 may be realized as a complementary metal-oxide-semiconductor (CMOS) camera. The optical sensor 7 looks through the display unit 3. In other words, it receives the reflection of the object through the display unit 3. The image reflected by the object, such as the user, is captured by the light sensitive area 8. When light from the reflected image reaches the light sensitive area 8, a sensor signal indicating an illumination of the light sensitive area 8 is generated. Preferably, the light sensitive area 8 is divided into a matrix of multiple sensors, which are each sensitive to light and each generate a signal in response to illumination of the sensor.

Instead of a CMOS camera, the optical sensor 7 can be any type of optical sensor designed to generate at least one sensor signal in a manner dependent on an illumination of the sensor region or light sensitive area 8. The optical sensor 7 may be realized as a charge-coupled device (CCD) sensor.

The signals from the light sensitive area 8 are transmitted to the processor unit 5. The processor unit 5 is configured to process the signals received from the optical sensor 7 (which form an image). By analyzing a shape of the laser spots reflected by the object and captured by the optical sensor 7, the processor unit 5 can determine a distance to the object and a material information of the object. In the example of FIGS. 1 and 2, the imaging unit 4, the processor unit 5 and the output unit 6 can exchange data via connection cables 10.

The display device 1 shown in FIG. 1 and FIG. 2 is capable of providing user-related and/or process-related information on the display unit 3 thereof.

This can be achieved by executing a method for providing user-related and/or process-related information using the display device 1 of FIGS. 1 and 2. Example for such methods will be described in the following in conjunction with FIGS. 3 to 6.

Figure 3:
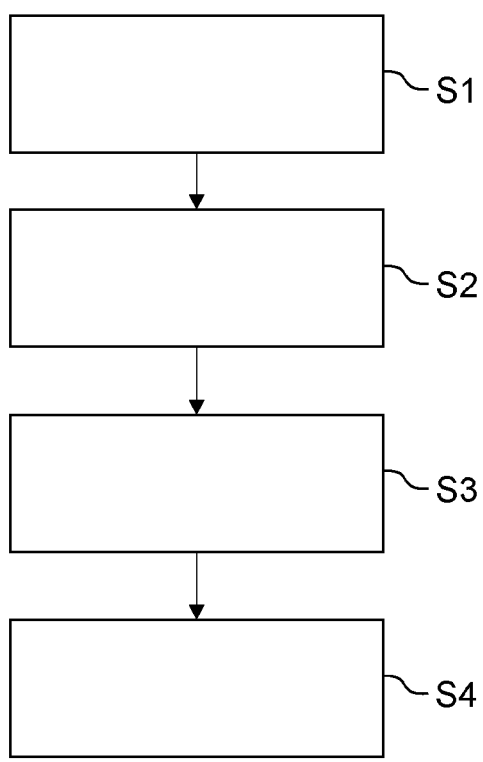
FIG. 3 shows a method for providing user-related and/or process-related information by a display device according to a first embodiment.

FIG. 3 shows a method for providing user-related and/or process-related information by a display device 1 according to a first embodiment. The method of FIG. 3 can be executed by the display device 1 of FIGS. 1 and 2. The method of FIG. 3 comprises the method steps S1 to S4:

In step S1, a process request for executing a process including illumination and/or measuring and/or recording is received, said process request being executable by the display device 1.

In this regard, illumination particularly includes at least one illuminating step executable by the display device 1, in particular by the illumination source 9 of the display device 1 (see FIG. 1 and FIG. 2). In particular, the illumination source 9 may be an active light source. Moreover, measuring particularly includes at least one measuring step executable by the display device 1, in particular by the optical sensor 7 measuring at least one reflection of the illuminated light output by the illumination source 9. Recording particularly includes at least one recording step executable by the display device 1, in particular by the imaging unit 4.

The process may be an authentication process for authenticating the user to the display device 1 or includes a part of a payment process, wherein said payment process may also include at least steps of an authentication process. The process request for executing said process may be triggered by an application, said application being internal or external to the display device 1.

In step S2, user-related and/or process-related information is determined based on the received process request. In particular, the user-related information comprises information selected for the user involved in the process. For example, the user-related information may include a user guidance for navigating the user through an illumination process, a required user action, in particular a request for inputting a personal identification number, a specific information for the user based on a current status of the user, in particular requesting inputting authentication information by the user, a user representation, and/or information specifically provided for the user, in particular selected by an application triggering the process request.

Furthermore, the process-related information may comprise information selected for the process including at least one illumination step and/or at least one measuring step and/or at least one recording step of the process. For example, the process-related information may include may include information associated with a type of the process, upcoming events related to the process, and/or highlighting parts of the display device 1 involved into the process.

In step S3, a display control signal is generated based on the user-related and/or process-related information. The display control signal is suitable for controlling the functioning of at least one pixel of the display unit 3 of the display device 1. In particular, the display control signal is configured such that at least a display area of the display unit 3 covering the illumination source 9 during illumination and/or a display area covering the optical sensor 7 during measuring and/or a display area covering the imaging unit 4 during recording is included into the presentation of the process-related and/or user-related information. By means of the generated display control signal, the user-related and/or process-related information is presented such that the display unit 3 is not disturbed noticeable by the user as a reaction to illumination and/or measuring and/or recording.

In step S4, the generated display control signal is provided, particularly to the display unit 3 of the display device 1.

Figure 4:
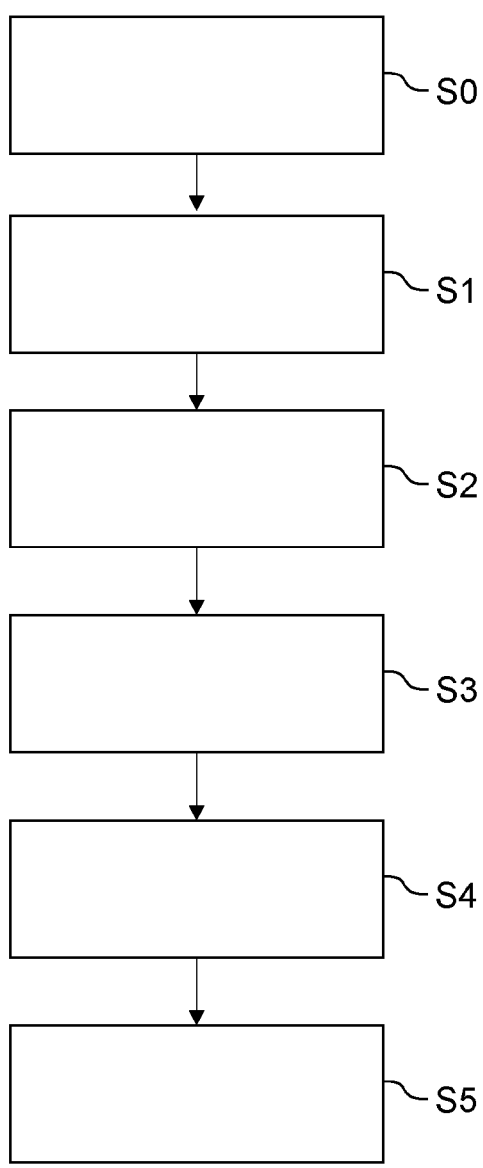
FIG. 4 shows a method for providing user-related and/or process-related information by a display device according to a second embodiment.

FIG. 4 shows a method for providing user-related and/or process-related information by a display device 1 according to a second embodiment. The method of FIG. 4 can also be executed by the display device 1 of FIGS. 1 and 2. The method of FIG. 4 includes the same method steps S1 to S4 as FIG. 3, the description of which will hence be omitted to avoid repetitions. In addition to steps S1 to S4, the method of FIG. 4 further includes steps S0 and S5, which are detailed in the following:

The step S0 is an initiation step in which the execution of the subsequent method steps S1 to S5 is triggered. In detail, the initiation may be triggered by an application (app) that is executable by the display device 1. After step S0, steps S1 to S4 as described with reference to FIG. 3 are executed.

After step S4, step S5 is executed. In step S5, the process is executed in response to the received process request, including controlling the display unit 3 by means of the provided display control signal such that the user-related and/or process-related information is output to the user by said display unit 3.

The step of outputting the user-related and/or process-related information may include providing a user guidance to the user during the execution of the process or directly after the process is executed. For example, outputting the user-related and/or process-related information may include representing an image of the user recorded with the imaging unit 4 of the display device 1, representing an animated emoji generated from image data obtained by the illumination source 9 illuminating light and the optical sensor 7 measuring at least one reflection of the illuminated light, or a simplified drawing generated from image data obtained by the illumination source 9 illuminating light and the optical sensor 7 measuring at least one reflection of the illuminated light.

Figure 5:
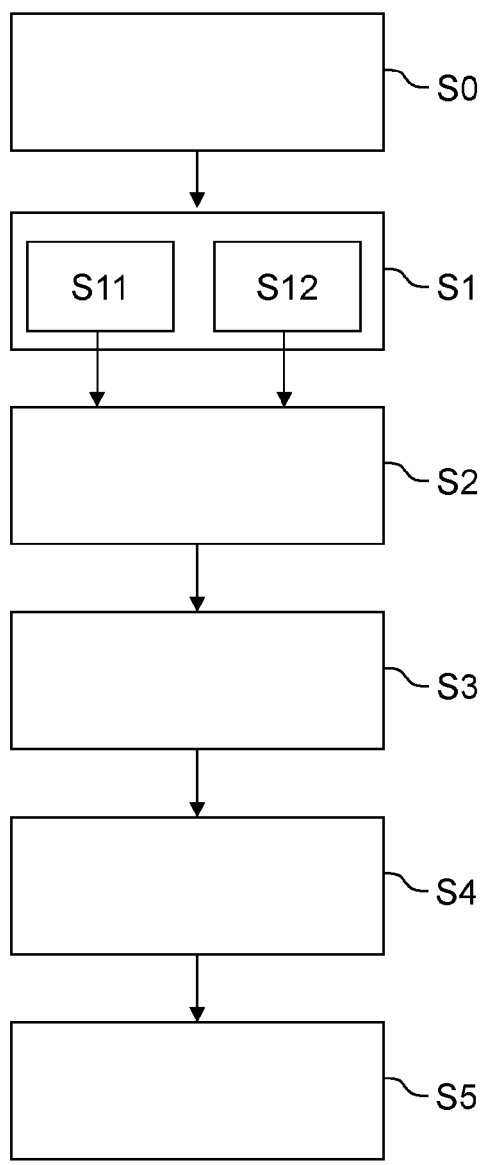
FIG. 5 shows a method for providing user-related and/or process-related information by a display device according to a third embodiment.

FIG. 5 shows a method for providing user-related and/or process-related information by a display device 1 to a user according to a third embodiment. The method of FIG. 5 can also be executed by the display device 1 of FIGS. 1 and 2. The method of FIG. 5 is based on the method of FIG. 4 and comprises—as FIG. 4—the method steps S0 to S5, wherein, in FIG. 5, the method step S1 is embodied by method steps S11 and S12.

In step S12, a process request for executing a process including illumination and/or measuring and/or recording executable by the display device 1 is received.

In step S12, an information request for providing additional information to the user is received. In particular, the information request is specific for the process request. In other words, the information request is associated to or dependent on the process request. Moreover, the information request and the process request are particularly triggered by one single application.

In the following step S2, the user-related and/or process-related information is determined based on the process request as received in step S11 and the information request as received in step S12. Then, the method steps S3 to S5 are executed, as described with reference to FIG. 4.

Figure 6:
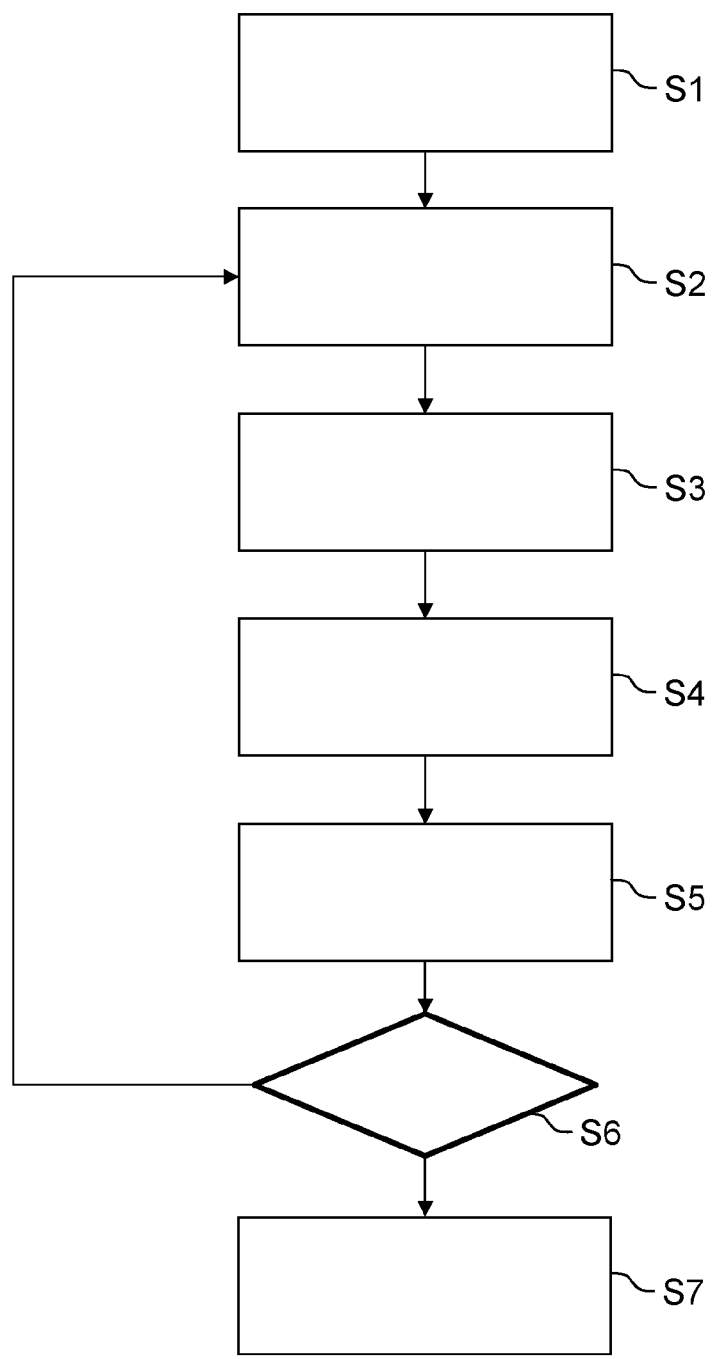
FIG. 6 shows a method for providing user-related and/or process-related information by a display device according to a fourth embodiment.

FIG. 6 shows a method for providing user-related and/or process-related information by a display device 1 to a user according to a fourth embodiment. The method of FIG. 6 can also be executed by the display device 1 of FIGS. 1 and 2. The method of FIG. 6 includes the method steps S1 to S5 as discussed above, and particularly method step S0 (not shown in FIG. 6). Additionally, the method of FIG. 6 includes method steps S6 and S7, which are executed after executing the process in step S5.

In step S6, feedback data indicating the result of the execution of the process is received.

If the received feedback data indicates a positive result, the method continues with step S7. In step S7, a positive feedback information is output to the user, e.g. indicating that the process is completed.

On the other hand, if the received feedback data indicates a negative result, the method continues with step S2 after step S6. Thus, the step of determining the user-related and/or process-related information of step S2 is restarted.

FIG. 7 shows an exemplary embodiment of a display device 1 displaying user-related and/or process-related information 11, 12, 13 in a process. The process may be an authentication process, in particular an authentication process for payment. In some embodiments, the display device comprises a housing 2, a display unit 3 and an imaging unit 4. The imaging unit 4 may be placed in the middle of the display unit 3. The user of the display device cannot see the imaging unit is placed behind the display unit. Thus, the user may not know where to look when an authentication process is initiated. Furthermore, without displaying information to the user via the display unit 3, the user may not know what process is initiated and what to do in order to complete the at least one step of the initiated process. To guide the user through the authentication process for payment information for user guidance is displayed in several forms such as text or symbol. A process request may be received. The process request may be generated by the application in which the user is in the course of buying product Y from company X. Process request is received associated with relevant information 11,12, 13. The relevant information 11, 12, 13 may be selected at least partially by the application in this concrete example. Some part of the relevant information may be automatically displayed due to the type of process initiated. In this example, the process is an authentication process for payment. Followingly, a camera may be depicted as process-related information 11 since an authentication process was initiated.

User-related and/or process-related information may be in the form of text such as 12, 13. In 12, 13 both user-related information such as "payment of 35 $ to company X for product Y" and process-related information such as "Authentication process" are comprised. Another example for user guidance can be 11 depicting a camera symbol. The lense of the camera may be depicted as a pattern. The pattern may comprise straight lines as shown or bended lines. Other examples for patterns may be a plurality of dots periodically or non-periodically arranged. Similarly, other symbol may be arranged periodically or non-periodically such as n-sided figures, wherein n comprises all natural numbers.

The symbol or arrangement of the symbol as pattern may be advantageous since no reading is required in order to guide the user intuitively. Since the camera symbol 11 is covering the imaging unit 4 of the display device 1, artifacts due to the initiated process comprising among others illuminating the user with patterned light may not be visible thereby improving the user experience and the quality of the displayed information. For more complex user-related and/or process-related information, text may be a more sufficient way to display the user-related and/or process-related information. Additionally or alternatively, a user representation may be displayed.

Figure 8B:
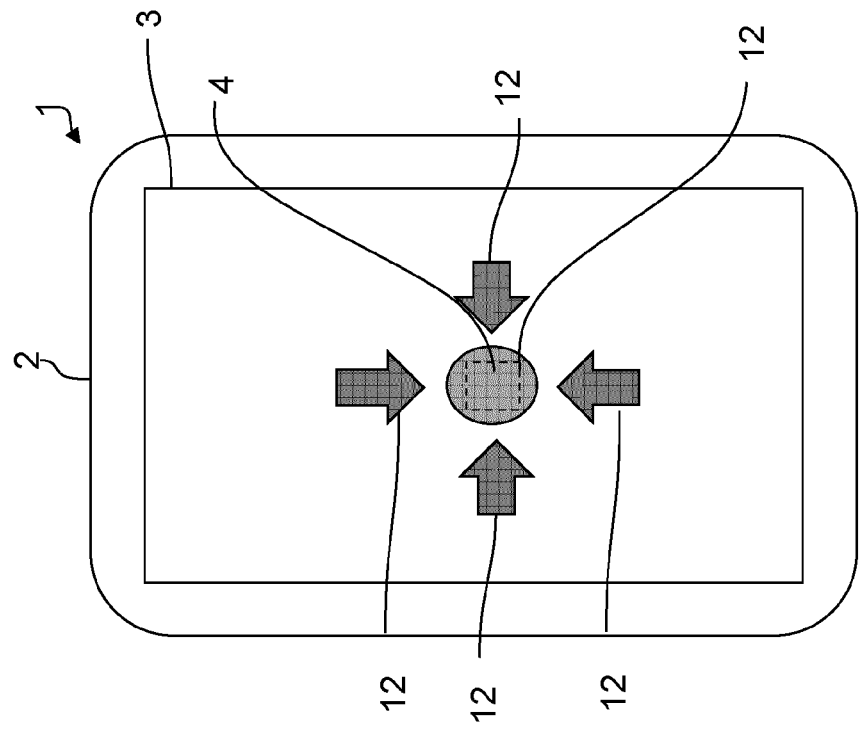
Figure 8A:
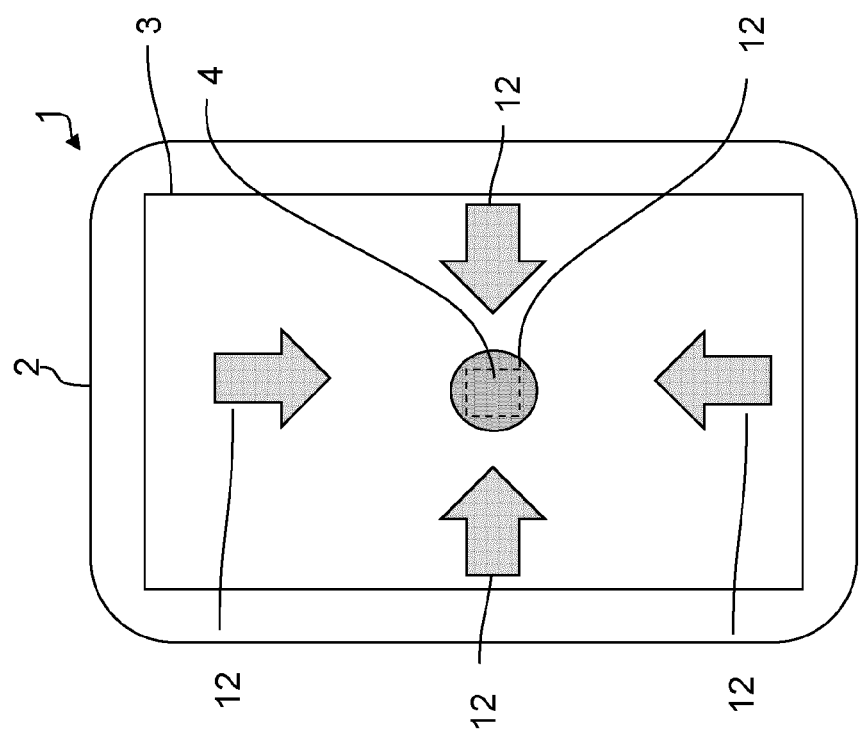

FIG. 8 shows an alternative set up of a display device 1, where arrows 12 are displayed in response to the display control signal generated according to aspects of this disclosure. The camera 4 is placed in the center of the display unit 3, and the arrows 12 representing user-related and/or process-related information indicate the position of the camera 4 behind the display unit 3. The user is guided by moving arrows 12 to focus towards the camera 4 hidden behind a central circle 12 displayed on the display unit 3. The arrows 12 move from the periphery of the display unit 3 towards the centrally displayed circle 12 as indicated by FIGS. 8*a* and 8*b*. The circle 12 and the arrows 12 are formed by activated pixels according to appropriately set pixel values.

Although the present invention has been described in accordance with preferred embodiments, it is obvious for the person skilled in the art that modifications are possible in all embodiments. For example, instead of storing feature information on authorized persons and comparing them with features extracted from the detected relevant faces, feature information on unauthorized persons may instead or additionally be stored for comparison purposes. Further, the order of the described method steps can be modified.

REFERENCE SIGNS

1 display device
2 housing
3 display unit
4 imaging unit
5 processor unit
6 output unit
7 optical sensor
8 light sensitive area
9 illumination source
10 connection cable
11 text or symbol as user-related and/or process-related information
12 arrow as user-related and/or process-related information
S0 initiation step
S1 receiving a process request for executing a process
S11 receiving a process request for executing a process
S12 receiving an information request
S2 determining user-related and/or process-related information
S3 generating a display control signal
S4 providing the generated display control signal
S5 executing the process
S6 receiving feedback data
S7 outputting positive feedback information

The invention claimed is:

1. A method for controlling a display device comprising a display unit configured for displaying information and an imaging unit located behind the display unit when viewed from an exterior of the display device, the method comprising:
   a) receiving (S1) a process request for executing a process comprising at least one step executable by the display device,
   b) determining (S2) user-related and/or process-related information based on the received process request, wherein the user-related information comprises information selected for the user involved in the certain process, and wherein the process-related information comprises information selected for the certain process including at least one illumination step and/or at least one measuring step and/or at least one recording step of the certain process,
   c) generating (S3) a display control signal based on the user-related and/or process-related information, wherein the display control signal is suitable for controlling the functioning of at least one pixel of a display unit of the display device, and
   d) providing (S4) the generated display control signal to the display unit;
   wherein the imaging unit comprises a camera, an illumination source for emitting light through the translucent screen, and/or a sensor, and the control signal is suitable for controlling the functioning of a plurality of pixels of the display unit covering the camera, the illumination source, and/or the sensor;
   wherein:
   the display control signal is suitable for controlling the functioning of at least an area of the display covering the camera, the illumination source, and/or the sensor such that at least darkened parts are displayed; and/or
   a brightness of the plurality of pixels of the display unit covering the camera, the illumination source, and/or the sensor is 50% or less.

2. The method according to claim 1, wherein the display control signal is suitable for controlling the plurality of pixels of the display unit covering the camera, the illumination source, and/or the sensor such that they are not fully turned on during the presentation of relevant information.

3. The method according to claim 1, further comprising:
   a step e) of executing (S5) the process in response to the received process request, including controlling the display unit by means of the provided display control signal such that the user-related and/or process-related information is output to the user by said display unit.

4. The method according to claim 1, further comprising:
   receiving (S12) an information request for providing additional information to the user, and
   determining (S2), in step b), the user-related and/or process-related information based on the received process request and a received information request.

5. The method according to claim 4, wherein the information request is specific for the process request.

6. The method according to claim 4, wherein the information request and the process request are triggered by one single application.

7. The method according to claim 4, wherein the process is an authentication process for payment or part of an authentication process for payment, and additional payment-related information, comprising at least one of price, merchant, article to be bought or related articles, are provided.

8. The method according to claim 1, further comprising:
   receiving (S6) feedback data indicating a result of the execution of the process,
   wherein, if the received feedback data indicates a positive result, a positive feedback information is output to the user, and
   wherein, if the received feedback data indicates a negative result, step b) of determining the user-related and/or process-related information is restarted.

9. A non-transitory computer-readable data medium storing a computer program including instructions for executing steps of the method according to claim 1.

10. A display device which is adapted to perform the method steps according to claim 1.

11. The method according claim 1, further comprising:
   receiving (S6) feedback data indicating a success of the execution of the process,
   wherein, if the received feedback data indicates a positive result, a positive feedback information is output to the user, and wherein, if the received feedback data indicates a negative result, step b) of determining the user-related and/or process-related information is restarted.

12. The method according to claim 1, wherein the method is executed by an operating system of the display device, and the process request is triggered by an application of the display device initiating the execution of the process.

13. A display device comprising:
a display unit,
an imaging unit located behind the display unit when viewed from an exterior of the display device,
a processor unit adapted to:
receive a process request for executing a comprising at least one step,
determine user-related and/or process-related information based on the received process request, wherein the user-related information comprises information selected for the user involved in the certain process and/or wherein the process-related information comprises information selected for the certain process including at least one illumination step and/or at least one measuring step and/or at least one recording step of the certain process, and
generate a display control signal based on the user-related and/or process-related information, wherein the display control signal is suitable for controlling the functioning of at least one pixel of the display unit, and
an output unit for outputting the generated display control signal to the display unit;
wherein the imaging unit comprises a camera, an illumination source for emitting light through the translucent screen, and/or a sensor, and the control signal is suitable for controlling the functioning of a plurality of pixels of the display unit covering the camera, the illumination source, and/or the sensor;
wherein:
the display control signal is suitable for controlling the functioning of at least an area of the display covering the camera, the illumination source, and/or the sensor such that at least darkened parts are displayed; and/or
a brightness of the plurality of pixels of the display unit covering the camera, the illumination source, and/or the sensor is 50% or less.

14. The display device according to claim 13, wherein
the display unit comprises a translucent touch screen; and/or
the imaging unit comprises a camera; and/or
the processor is further configured to perform image processing on an image recorded by the imaging unit to detect relevant faces thereon.

\* \* \* \* \*